March 27, 1951     J. W. SNAVELY     2,546,200

IMPACT CUSHIONING IDLER

Filed Sept. 28, 1946

JOSEPH WALTER SNAVELY
INVENTOR.

BY George A. Evans
ATTORNEY

Patented Mar. 27, 1951

2,546,200

UNITED STATES PATENT OFFICE 2,546,200

IMPACT CUSHIONING IDLER

Joseph Walter Snavely, Hales Corners, Wis., assignor to Chain Belt Company, Milwaukee, Wis., a corporation of Wisconsin Application September 28, 1946, Serial No. 700,045

6 Claims. (Cl. 74—230.7)

This invention relates to conveyor idlers for endless belt conveyor systems; more particularly to impact cushioning idlers used in said systems. In endless belt conveyor systems the usual practice is to have a loading station where material to be conveyed by an endless belt which is supported by rotatable idlers is deposited thereon; this is usually accomplished by means of a gravity feed arrangement. The materials deposited on the belt are numerous, and an example of range is from finely divided washed sand to heavy sharp pieces of mining ore. The greatest expense in an endless belt conveyor system is the endless belt itself. These belts have extended in some instances for a mile or so, and because of their construction are extremely expensive. Their construction comprises a carcass usually of cotton duck impregnated with rubber or longitudinal cords, with a covering of rubber enclosing and protecting the carcass. The flexible nature and structure of these belts renders them susceptible to the laceration of said cover and the rupture of the cords or fabric by sharp objects. This action usually occurs at the loading station of the conveyor where heavy and sharp objects strike the belt with considerable impact, and where there is not sufficient means to cushion the impact as where a rigid belt support is employed, the rubber covering of the belt is put in compression and the carcass beneath the covering is shock-tensioned in an extreme manner. Many attempts have been made to remedy the above described condition and any slight improvement has been welcomed by the industries using said conveyor systems because of the apparent great economy. However, the art of record does not show an impact cushioning device operating over a range of loading conditions, which effectively reduces the damage to conveyer belts to the minimum. Further, it does not show an impact idler which is as simple in construction and has such features permitting facile and economical maintenance as the present invention.

It is the object of this invention to provide an impact cushioning device which will effectively increase the life of an endless belt.

It is the further object of this invention to provide an impact cushioning idler which will permit the greatest possible deflection under impact without impairing roll stability.

It is further the object of this invention to provide an impact-absorbing idler roll which is deformable under impact thus absorbing the energy of said impact, and relieving the belt of the strains to which it would otherwise be subjected.

Another object of this invention is a simple impact idler being substantially free from maintenance problems.

It is further the object of this invention to provide an impact idler which is effective to absorb the energy of shocks in loading under most all conditions of loading.

Another object of this invention is to provide an impact idler of rugged construction.

A further object of this invention is to provide an impact idler of inexpensive manufacture.

Referring to the figures.

Like numerals refer to like parts throughout.

Figure 1:
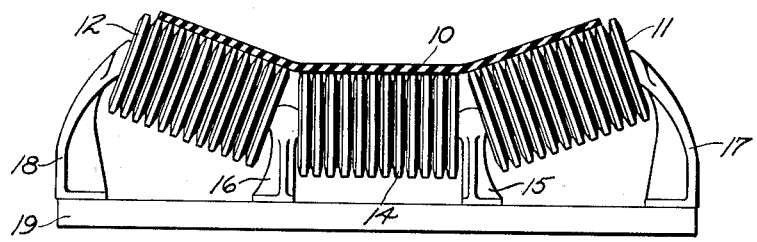
Fig. 1 is a front elevation of the improved impact idler disposed to form the belt into a trough shape.

Fig. 1 shows the belt 10 formed into a trough shape by the side idlers 11 and 12. The bottom of the belt 10 is further supported by the horizontal roll 14. The horizontal roll 14 is supported by the brackets 15 and 16. The side idler roll 11 is supported by a side bracket 17 and the center bracket 15. Side idler roll 12 is supported by the bracket 18 and the center bracket 16. These brackets are of the type generally known as the "Rex" or "Stearns' type bracket manufactured by Chain Belt Company, although experience has shown that a slightly heavier bracket might feasibly be used. The brackets are mounted on a base 19 which is constructed so as to be readily mounted on a further support member below the loading station of an endless belt system. It has been found to be the best practice to mount several of the idler roll assemblies aforesaid just below the loading station, in supporting relationship to the belt 10.

Figure 2:
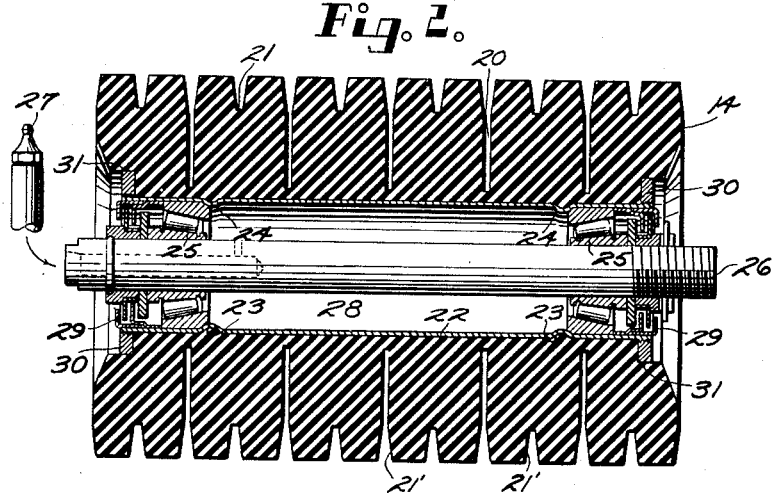
Fig. 2 is an enlarged sectional view of the center idler shown in Fig. 1.
Figure 3:
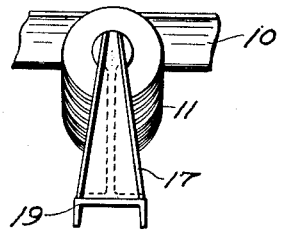
Fig. 3 is a side elevation of the idler shown in Fig. 1.

Fig. 2 shows an enlarged sectional view of the idler 14. The side idlers 10 and 12 have the same features of construction as this roll. Indeed, it has been found that if a plurality of rolls be arranged axially in a horizontal plane none of the features of the invention are lost. Thus, the rolls 14 may be facilely arranged to suit the job requirements of the user. The roll 14 is an integrally molded rubber structure preferably conforming to the standard of forty (40) Shore hardness in this embodiment of the invention. The diameter of the instant roll is six inches, having a length of nine inches. Deep primary annular groves 20 are disposed on the roll so as to be in spaced regularity. Also, the shallow secondary annular grooves 21 are interspaced between said primary grooves in spaced regularity. The ends 21' of both types of grooves are flared outwardly to provide a smaller contact area with the belt 10 and to permit the mold to be more easily stripped from the roll.

A hollow steel tube 22 is press fitted into the matching internal surface of the roll 14. This alone is normally sufficient to prevent relative rotation. However, the roll is further locked on the tube by reason of the fact that the compressed rubber expands and tends to fill the grooves or indentations 23 placed at each end of the tube. The metal displaced by said groove forms an internal ridge 24 which acts as a stop for the races of the bearings 25. The longitudinally extending shaft 26 is mounted to the internal races of said bearings and it is attached to the brackets 15 and 16. The bearings 25 are pressure lubricated by means of a fitting 27 which is in communication with the chamber 28 formed within the tubular shaft 22. The lubricant is sealed in the chamber by means of labyrinth seals 29 placed at both ends of said tube.

The roll 14 is further retained on the tube 22 by means of large washers 30 which are threaded on the tube so as to slightly compress the rubber roll 14. The washers fit into recessed counterbores 31 in the rubber roll, which permits flush or near mounting to adjacent brackets or rolls. The ends of the tube 22 are further pinched over the washers so as to lock them in place.

While it has been proposed in the past to make impact idlers with a solid rubber roll, and also out of adjacent spaced rubber sections, these efforts have not effectively reduced belt damage. It would appear that the invention as here disclosed would have the same absorbing characteristics of say the known solid rubber roll, or the rubber segment roll. However, it has been accurately determined by tests that the roll of this invention can absorb a far greater amount of impact than any such previously known type. This is by virtue of the novel feature of placing the primary groove 20 in the roll; this groove is for maximum cushioning; also placing the shallow secondary grooves 21 in the roll; these are for surface softness to provide protection against belt cover laceration. The secondary grooves further serve, under deformation from heavy impacts, to transmit their effects to the sections between the deep primary grooves. It has been found that the primary grooves 20 should be about one-eighth inch wide and about one and three-fourths inches deep. The secondary grooves 21 should be about one-eighth inch wide and about one-half inch deep. Also, best results can be obtained when the ends of the grooves flare outwardly about one-sixteenth inch at eachc side of the groove. The depth of the primary grooves, which as mentioned above is many times their width, is of the same order as the distance between the primary grooves. The secondary grooves may be efficiently disposed about halfway between the primary grooves.

The idler roll structure disclosed is a superior one having great resilience and load bearing qualities; also as is apparent there is no maintenance necessary of the type known to the pneumatic type idlers. The maintenance required is indeed very simple and usually comprises that necessary for lubrication.

While one embodiment of the invention has been illustrated and described in detail, it will be appreciated that modifications of the embodiment may be made without departing from the spirit of the invention. For instance, the rolls 11, 12, and 14 which are illustrated herein as being each made from a solitary integral mold might, if more convenient, be made in sections, either secured together or otherwise integrally functioning as by being tightly pressed together when mounted on their supporting shafts. Similarly, while rubber rolls have been illustrated and described, it will be appreciated that equivalent materials, having rubber-like characteristics, may be employed, and the term "rubber" is to be construed accordingly.

I claim:

1. An impact-absorbing belt conveyer idler comprising a rotatably mounted, rigid member and an integral roll of solid, yieldable, rubber-like material surrounding said rigid member, said roll having relatively deep, narrow primary grooves in its periphery extending substantially more than half the distance from the surface of the roll to the rigid member, thereby affording lateral flexing movement and deformation under heavy impacts on the belt to absorb the same, and secondary grooves of lesser depth arranged between the primary grooves to afford additional flexing movement and deformation, whereby under lighter impacts a soft surface is obtained which prevents belt cover lacerations, and initial effects of heavier impacts are more readily transmitted to the sections of the roll between the primary grooves.

2. An impact-absorbing belt conveyer idler comprising a rotatably mounted rigid member and a cushioning roll of solid, yieldable, rubber-like material surrounding said rigid member, said roll having a series of relatively deep grooves in its periphery of a depth substantially in excess of half the thickness of said roll, said grooves being of a width many times less than their depth, the depth of the grooves being of the same order as the distance between them and affording lateral flexing movement and deformation of sections of the roll between the grooves under heavy impacts imposed on the belt.

3. An impact-absorbing belt conveyer idler comprising a rotatably-mounted rigid member and a contiguous, cylindrical covering of solid, yieldable, rubber-like material arranged with grooves in its outer surface, some of said grooves being of shallower depth than others whereby lighter impacts are absorbed by the deformation of the covering between the shallower grooves and heavier impacts are transmitted to the inner portions of the covering and absorbed by the deformation of the covering between the deeper grooves.

4. An impact-absorbing belt conveyer idler comprising a rotatably-mounted rigid member and a contiguous surrounding roll of solid, homogeneous, yieldable, rubber-like material arranged with narrow annular grooves in its outer surface, some of said grooves being of a depth extending inwardly through a major portion of the roll and having a width many times less than their depth while other grooves intermediate the aforesaid grooves are of appreciably less depth to provide a soft surface on the periphery of the roll.

5. A belt conveyer idler comprising a rotatably-mounted rigid member and an impact-absorbing covering of solid, homogeneous, yieldable material containing shallow grooves to absorb light impacts on the surface of the covering, some of said shallow grooves having an inwardly recessed portion deep with respect to their width and extending substantially more than half the thickness of the covering to distribute heavy impacts into the inner portions of the covering where a greater mass of the covering may contribute to the impact absorption.

6. A belt conveyer idler comprising a rotatably-mounted rigid member and an impact-absorbing covering of solid, yieldable material containing shallow grooves to absorb light impacts in the outer surface of the covering and grooves deep with respect to their width to distribute heavy impacts into the inner portion of the covering where a greater mass of the covering may contribute to the impact absorption.

JOSEPH WALTER SNAVELY.

REFERENCES CITED

The following references are of record in the file of this patent:

UNITED STATES PATENTS

| Number | Name | Date |
|---|---|---|
| 2,048,635 | Kraft | July 21, 1936 |
| 2,164,819 | Hicks et al. | July 4, 1939 |
| 2,169,624 | Weiss et al. | Aug. 15, 1939 |
| 2,423,407 | Searles et al. | July 1, 1947 |